United States Patent [19]

Perry et al.

[11] Patent Number: 4,889,636

[45] Date of Patent: * Dec. 26, 1989

[54] HIGH FLUX RO/UF MEMBRANES

[75] Inventors: Mordechai Perry, Petach Tikvah; Reuven Kotraro; Charles Linder, both of Rehovot; Gershon Aviv, Tel Aviv, all of Israel

[73] Assignee: Aligena, AG

[*] Notice: The portion of the term of this patent subsequent to Apr. 21, 2004 has been disclaimed.

[21] Appl. No.: 868,747

[22] Filed: Jul. 11, 1986

Related U.S. Application Data

[63] Continuation of Ser. No. 554,214, Nov. 22, 1983, Pat. No. 4,659,474.

[30] Foreign Application Priority Data

Nov. 23, 1982 [CH] Switzerland ............................ 6828 82

[51] Int. Cl.$^4$ ............................................. B01D 13/00
[52] U.S. Cl. ..................................... 210/651; 210/654; 210/500.37; 210/500.38
[58] Field of Search ...................... 210/639, 490, 321.1, 210/654, 651, 500.38, 638, 500.37; 427/244, 245, 246

[56] References Cited

U.S. PATENT DOCUMENTS

| | | | |
|---|---|---|---|
| 3,373,056 | 3/1968 | Martin | 210/639 X |
| 3,462,362 | 8/1969 | Kollsman | 210/639 X |
| 3,503,789 | 3/1970 | Johnson et al. | 210/500.37 X |
| 4,230,463 | 10/1980 | Henis et al. | 55/68 X |
| 4,604,204 | 8/1986 | Linder et al. | 210/490 |
| 4,612,118 | 9/1986 | Kamiyama et al. | 210/500.37 X |
| 4,659,474 | 4/1987 | Perry et al. | 210/639 X |

*Primary Examiner*—Frank Spear
*Attorney, Agent, or Firm*—Lackenbach Siegel Marzullo & Aronson

[57] ABSTRACT

Dynamic membranes are obtained by coating on a porous polymeric substrate containing functional groups a chemically reactive hydrophilic polymer from a dilute aqueous solution under pressure and crosslinking said polymer present on the porous substrate as thin layer with low molecular polyfunctional compounds. The new membranes show good solvent and compaction resistance and resistance to separation of the individual layers. They can be used in ultrafiltration and reverse osmosis processes.

32 Claims, No Drawings

HIGH FLUX RO/UF MEMBRANES

This is a continuation of application Ser. No. 554,214, filed Nov. 22, 1983, now U.S. Pat. No. 4,659,474.

This invention relates to the use of the phenomenon of pressure concentration polarization to deposit a thin film of a hydrophilic polymer on a modified polymer membrane support so that the deposited film is chemically bonded to the support and crosslinked with itself to form a bifurcated structure. In this manner, stable highly-rejecting membranes are achieved with fluxes 2 to 3 times higher than could be achieved by known membranes for the equivalent rejections.

The inventive membrane is composed of a thin crosslinked hydrophilic film, chemically bonded to a thicker, more porous and optionally cross-linked support. Though both the components of the membrane (the thin film and thicker support) comprise the invention, the film may be thought of as improving the rejection of the support membrane to solutes and increasing the efficiency of separating low molecular weight monovalent salts from multivalent or higher molecular weight solutes. Insofar as the membrane components are each crosslinked, and also bonded to each other, the membrane exhibits solvent and compaction resistance, and resistance to separation of the individual layers.

Concentration polarization is a well-known phenomenon in the areas of ultrafiltration (UF), reverse osmosis (RO) and electrochemistry. This phenomenon rises from the accumulation at the upstream (or concentrate side) of a membrane of solute molecules which are rejected or returned by the membrane in the course of osmosis/filtration.

In most cases, concentration polarization is a nuisance, decreasing efficient membrane operation and reducing the efficiency or rate of a given separation process (W. F. Blatt, et al, in Membrane Science and Technology, Ed. J. E. Flinn, pp. 47–97, Plenum Press, 1970).

In some cases, however, the above phenomenon is used to produce membranes with unique properties. The best example is in dynamic membrane formation, wherein a thin barrier is deposited under pressure on a support from a dilute solution of a polymer (D. G. Thomas, in REVERSE OSMOSIS AND SYNTHETIC MEMBRANES, Ed. S. Sourirajan, pp. 295–312, NRCC Publications, 1977). An example of such a process is the formation of a composite membrane of polyacrylic acid on a porous plastic support (Johnson, Minturn & Wadia, J. Electroanal, Chem. 37, 267, 1972).

In another example pressure filtration is used to deposit polyamines on collodion membranes (E. Hoffer and O. Kedem, Ind. Eng. Chem. Process Des. Develop., Vol. 11, No. 2, 1972). A 3.6% solution of polyvinylamine hydrochloride containing 1M NaCl and buffered to pH 8.7 was filtered through an activated collodion membrane, and the polymer adsorbed onto that membrane. In that example, penetration into the pores of the support was not prevented, nor was the polyvinylamine layer crosslinked (such crosslinking was found necessary to maintain rejection stability). Thus the use of pressure to apply a polymeric material to a support or membrane, thus changing the membrane's or support's properties, is found in the literature.

According to the present invention, however, pressure (together with the use of dilute solution to achieve high rejection of the depositing polymer) is used to control the deposition of a film which is bonded to the support and crosslinked itself.

Membranes of modified polymers made by a chemical reaction between a hydrophilic polymer and a polymer membrane containing reactive groups are known from European Patent Applications 25973, 26319, 47953 and 61424. The basic material for the membranes so modified may be cellulosic materials, such as cellulose acetates, or polymers (and copolymers) containing acrylonitrile, vinyl alcohol or sulfone groups. As the polymer is applied by dipping the membrane into a solution of it, there is very little control over the thickness of the deposited film or its penetration into the pores. To achieve a high rejection (e.g. 99% to dye of formula (108)), a relatively high concentration of polymer solution (5–10%) is used. As a result of an investigation into the parameters affecting flux and rejection, it was determined that while the deposited polymer layer was crucial for a high rejection, the fact that it penetrated into the top layer of the support, reduced the membrane's flux.

A method has been now found whereby penetration of the coating polymer (e.g. polyethylene imine-PEI) into the pores is minimized, and only a thin layer of the coating is bonded to the membrane. The method comprises the deposition of a polymer coating or film by pressure concentration polarization.

Therefore, it is one object of the present invention to provide new dynamically formed membranes in the form of a thin layer on a porous support so that the support and the thin layer are polymeric and chemically bonded with each other, the layers themselves being cross-linked with low molecular weight polyfunctional compounds.

Other objects of the present invention are processes for the manufacture of the dynamic membranes and the composites (films of the cross-linked polymers on porous supports), as well as the use of these membranes in ultrafiltration and reverse osmosis, viz. in fields involving concentration and purification of liquids, e.g. separating salts from organic compounds or purifying waste waters.

These and other objects of the present invention will be apparent from the following detailed description.

The present invention may be used to modify ultrafiltration or microporous membranes, with average pore sizes varying from 10 to 5000 Å preferably 20 to 200 Å for the achievement of optimum rejection with flux. The average pore size of the inventive (modified) membranes varies from about 1 to 200 Å, preferably from 5 to 50 Å.

The inventive membranes are composite membranes of a thin layer deposited on a modified polymer support.

The dynamically formed membranes are obtained by
 (a) coating a chemically reactive polymer from a dilute aqueous solution under pressure onto the porous polymeric support containing functional groups reactive with said polymer and
 (b) cross-linking said polymer coated on the porous support as a layer with polyfunctional low molecular compounds.

The process for the manufacture of these membranes comprises
 (a) depositing from a dilute aqueous solution and under pressure a thin layer of a hydrophilic polymer onto the support, the polymer and the support containing functional groups reactive with one another, and (b) cross-linking the deposited polymer with polyfunctional low molecular weight compounds.

The deposition of the polymeric film onto the porous substrate can also be carried out with dilute aqueous solutions containing the polymer together with the polyfunctional low molecular weight compounds, which preferably are non-ionic ones.

By the inventive process for the manufacture of these membranes one can achieve a controlled deposition of a thin layer of a polyelectrolyte or hydrophilic polymer containing reactive groups with minimal penetration of (undesired) amounts of these species into the pores of the support;

a thinner, more uniform membrane (film) than has hitherto been possible;

a complete and homogeneous cross-linking of the polyeletrolyte or the hydrophilic polymer and thus an improvement with regard to mechanical and chemical stability of the membrane.

In this invention, the controlled deposition of a reactive polymer onto the support is achieved via the application of pressure to a dilute solution of that polymer. Important variables in this step are the thickness of the thin film, its uniformity and the degree of polymer penetration into the support. The parameters controlling these variables are: ($a_1$) polymer solution concentration, ($b_1$) magnitude and time of application of pressure, and ($c_1$) the relationship between the size of the polymeric particles and the pore size of the support, which is a measure of the rejection of the polymer by the support.

Some of the recommended conditions which should be met by the process for the manufacture of the inventive high flux membranes are:

1. The pore size of the support should be preferably about 98% rejecting to the coating polymer (PEI), or its equivalent.

2. The coating polymer should have a high enough molecular weight to be rejected by the support during the modification.

3. To achieve a thin film and thus high flux, the polymeric solution should be relatively dilute (preferably less than 1%). The polymer concentration may be in the range of 0.01 to 5% by weight; polymers of lower molecular weight are generally used in higher amounts, that is up to 5%; elongated polymers are applied in lower and globular polymers in higher concentrations within the given range.

4. The cross-linking agent should be present in part or preferably wholly in the modifying polymeric solution. Optionally, an additional step for cross-linking may be necessary. When using the cross-linking agent together with the polymer, non-ionic polyfunctional cross-linking agents are preferred. The cross-linking step (b) may be used in addition (using preferably ionic polyfunctional compounds) or omitted.

By this procedure higher fluxes can be achieved than have previously been achieved for molecular cut-offs in the range of a molecular weight of 100–5000, preferably 300 to 2000. More specifically, while known membranes show e.g. up to 99% rejection to dye of formula (108) with fluxes of 500–1400 l/m$^2$.d at 20 bars, the inventive membranes achieve fluxes of 2000–3500 l/m$^2$.d for the same rejection and operating conditions.

According to the known processes for the manufacture of modified membranes, as mentioned above, a polymer (PEI) layer is applied by self diffusion from a relatively concentrated solution (10%) by immersion.

In this way, high rejections are achieved, but with relatively low flux (800–1000) l/m$^2$.d. Immersion into a dilute solution (less than 1%) does not give, by self diffusion, sufficient rejection. If, however, pressure (of at least 2, preferably 10 to 100 and most preferred 10 to 20 bars) is applied to this dilute solution, a concentration polarization layer of PEI builds up on the surface as a function of the support's rejection of the PEI and the magnitude and duration of pressure. Film thickness increases with time, pressure and the polymer concentration. An optimum exists, however, for the above variables, beyond which a decline in flux will occur. The thickness of the dynamically manufactured membrane (film) on the porous support can be within the range of from the thickness of a monomolecular layer (about 5 to 10 Å) up to about 5000 Å, and preferably up to about 1000 Å.

The range of polymer concentrations useful for this invention may be defined as:

(i) Upper limit: the highest concentration which does not significantly decrease the flux of the unmodified support by simple immersion into a solution of that concentration.

(ii) Lower limit: the lowest concentration which, after the application of pressure, will still increase the rejection of the membrane to about 98%.

The concentration of PEI useful for the performance of this invention is dependent on such variables as the pore size and distribution of the support or modified support membrane on which the polymer (PEI) is deposited. It is also a function of the molecular weight of the PEI. For example, if a UF-polyacrylonitrile membrane with a rejection to solute of a dye of formula (108) of 50% is modified with hydroxylamine and cyanuric chloride (with the objective of introducing reactive chloro-triazinyl groups for binding the PEI of the next step and crosslinking of the support), a useful concentration of PEI will not reduce significantly (10–20%) membrane flux by simple immersion. As shown in Table 1 for the specific membrane described above, PEI solutions having a concentration <1% did not lead to significant flux decline.

TABLE 1

Flux/Rejection of Polyacrylonitrile membranes prepared with different concentrations of PEI (MW 30.000)[1]

| | | 10 cm tubular-membranes | |
|---|---|---|---|
| No. | Concentration of PEI | Flux l/m$^2$ · d | Rejection % |
| 1 | 10% | 1600 | 98.1 |
| 2 | 1% | 5860 | 45.3 |
| 3 | 0.1% | 6200 | 54.7 |
| 4 | 0.01% | 6200 | 52.0 |
| 5 | without PEI | 6600 | 50.0 |

[1]Prior to immersion in PEI the membranes were modified with NH$_2$OH, 60° C., 5 min. and cyanuric chloride for 5 min. at 0° C., pH 9.0.

Testing conditions: 6% dye of formula (108), 25 bars, 50° C.

The basic membranes (supports) are e.g. those of cellulose, cellulose derivatives (cellulose acetates), polyvinyl alcohols, (aromatic) polysulfones and polyepoxides, polystyrenes and polyacrylonitriles, corresponding copolymers (ter-, tetra polymers), block polymers or graft polymers. Into these polymers polyfunctional (reactive) groups are introduced through chemical modification; the polymers are optionally pre-crosslinked. e.g. with ionic polyfunctional low molecular weight compounds.

The membrane modification prior to concentration polymerization can be carried out with a multifunctional compound (hereinafter mentioned) and a polymer which will become chemically bonded by this multifunctional compound to the membrane; this modification is suitable for cellulose acetate or polyvinylalcohol membranes, also for other polymers containing hydroxyl groups, such as bisphenol-epichlorohydrin resins.

Membranes containing polymers with aromatic moieties (e.g. polysulfones, polyepoxides or polystyrenes) can be modified the same way when there are reactive sites present in the basic supports. As a rule they are introduced prior to said modification by e.g haloalkylation (chloromethylation) or coupling with a diazo compound (introducing e.g an aminoarylazo group), optionally followed by further chemical reactions.

In the case of membranes of polyacrylonitriles (and related copolymers) a suitable means for introducing reactive groups into the membranes is the chemical reaction with hydroxylamine to make amidoxime groups which are then further modified with the multifunctional compound and the polymer (as mentioned hereinbefore).

The present invention is now described in more detail by using polyacrylonitrile membranes as starting (basic) membranes (supports) without restricting it, however, to this type of support only.

One basic membrane which is modified according to the invention, consists of polyacrylonitrile or of acrylonitrile copolymers, in which case the proportion of acrylonitrile units in the copolymer is at least 5, preferably at least 20, and in particular at least 50% by weight. Other suitable polymers (in addition to polyacrylonitrile) are those of alkyl ($C_1$–$C_6$)-acrylonitriles, for example methacrylonitrile or hexylacrylonitrile, arylacrylonitriles, for example phenylacrylonitrile, halogenoacrylonitriles, in which the halogen is fluorine, chlorine or bromine, for example $\alpha$-fluoroacrylonitrile or $\alpha$-chloroacrylonitrile, and thioacrylonitriles.

Suitable co-monomers which can be copolymerized with acrylonitrile are monomers which contain, for example, hydrophobic, hydrophilic, polar or ionic groups, especially, for example, vinyl esters having 2 to 18 carbon atoms in the acid moiety, especially vinyl acetate, vinyl ethers having 3 to 12 carbon atoms, vinypyridine, vinyl chloride, styrene, butadiene, acrylic acid or methacrylic acid or (meth)acrylates, for example those having 1 to 4 carbon atoms in the ester moiety. Further suitable monomers are maleic anhydride, 2-aminoethyl methacrylate and allyl compounds, for example allyl alcohol, allyl- or methallyl-sulfonic acid and their salts (alkali metal salts), allyl halides or methallyl halides, allylamines or allyl p-toluenesulfonates. Further suitable compounds are terpolymers, for example of acrylonitrile, styrene and butadiene (ABS polymers), acrylonitrile/vinyl acetate/methylmethacrylate or acrylonitrile/methyl methacrylate/sodiumallylsulfonate, or tetrapolymers based on acrylonitrile. Component (a) can also contain mixtures of the (co)polymers mentioned.

Further membranes which are suitable for modification according to the present invention are also those in which some of the nitrile groups of the acrylonitrile units have been hydrolyzed to carboxyl groups or reduced to amino groups. Furthermore, those membranes in which the comonomers (in addition to the acrylonitrile) are chemically modified, are also suitable. However, the membranes should contain at least 5% of nitrile groups, so that the chemical modification according to the invention can be carried out.

Membranes to be modified according to the present invention are commercially available, or are readily prepared by those skilled in the art. Casting solutions and methodology are known from the patent and technical literature (cf. e.g. GB 1 327 990 and GB 2 016 301).

The porous starting support (made of polyacrylonitrile or copolymers of acrylonitrile and ethylenically unsaturated comonomers) can be treated for 3–60 minutes at temperatures of about 50°–75° C. with an aqueous solution of hydroxylamine (2–15%), which has a pH value of 2 to 11, and preferably of 6 to 7 (for example adjusted with sodium carbonate). The rate of conversion of nitrile to amidoxime groups can be from 0.5 to about 30% and preferably in the range of 5.0 to 10%, for example, for polymers containing 80% or more of acrylonitrile units.

Polyfunctional reagents are used to modify the support membrane prior to the step of concentration polarization (CP) and during CP they may be included in the polymer solution. In the former case, they are used to bond the polymer with the amidoxime functions, and in the latter they function to link the polymers to amidoxime functions or to a previously bonded coating of the same or optionally different polymer. The preferred compound used is cyanuric chloride, but other cyclic carbonic acid imide halides could be used successfully. These and additional polyfunctional reagents are given below.

Typical reaction conditions for using cyanuric chloride in steps prior to CP are: The membrane treated with $NH_2OH$ is then removed from the reaction solution and placed in an aqueous solution (suspension) of the (polyfunctional) organic compound, which, for example, when cyanuric chloride is used, can contain 0.5–5 parts of cyanuric chloride per part of membrane. The reaction temperature should be kept below 4° C., for example at 0° C., in order to prevent hydrolysis of the cyanuric chloride; the pH range is approximately between 8 and 11 and the reaction time can be from one minute to 5 hours, but is preferably between 5 and 30 minutes.

Compounds which can be used as the polyfunctional reagent generally are monomeric compounds which possess crosslinking properties and can enter into chemical bonding both with the membrane and the coating polymer. These compounds, which have at least two functional groups, possess their reactivity by virtue of multiple bonds, epoxide, aziridine, aldehyde, imidate, isocyanate, isothiocyanate, hydroxyl or anhydride groups (these bonds or groups may be further substituted), or of substituents detachable as tertiary amines or preferably as anions, preferably halogen anions, and combinations of these are also possible. The compounds contain, for example, the groupings

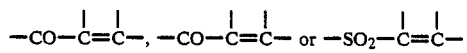

as a multiple bond to which further substituents can be added on. The isocyanate or isothiocyanate group can also be considered as a group of this type. Compounds containing quaternary ammonium groups, which are split off as tertiary amines, are for example a trimethylammonium or pyridinium group or sulfonium groups, as the leaving groups. Preferably they contain substituents with groups that split off as an anion, and preferably containing a reactive halogen atom, as the reactive group. These leaving groups possess reactivity by virtue of, for example, the influence of electrophilic groups, such as the —CO— or —SO$_2$— group in saturated aliphatic radicals (acyl halides). They also possess their reactivity by virtue of the influence of e.g a quaternary nitrogen atom, such as in the group ≡⊕NCH$_2$CH$_2$Cl, or in aromatic radicals by virtue of the influence of electrophilic groups in the o- and p-position, for example nitro, hydrocarbon-sulfonyl or hydrocarboncarbonyl groups, or of a bond to a ring carbon atoms which is adjacent to a tertiary ring nitrogen atom, as in halogenotriazine or halogenopyrimidine radicals.

Compounds which have proved particularly advantageous are cyclic carbonic acid imide-halides and in particular halogeno-diazines or -triazines containing at least two reactive substituents, as well as compounds containing isocyanate or isothiocyanate groups. Tetrachloropyrimidine and in particular cyanuric chloride have proved particularly advantageous.

Some cyclic carbon acid imidehalides used here as crosslinking component (b) are exemplified by (A) s-Triazines containing at least two identical or different halogen atoms bonded to carbon atoms, for example cyanuric chloride, cyanuric fluoride, cyanuric bromide and also primary condensation products of cyanuric fluoride, cyanuric chloride or cyanuric bromide and, for example, water, ammonia, amines, alkanols, alkylmercaptans, phenols or thiophenols;

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenopyrimidines are 2,4,6-trichloro- and 2,4,5,6-tetrachloro-pyrimidine;

(C) Halogenpyrimidinecarboxylic acid halides, for examples dichloropyrimidine-5- or 6-carboxylic acid chloride;

(D) 2,3-Dihalogeno-quinoxaline-, -quinazoline- or -phthalazinecarboxylic acid halides or -sulfonic acid halides, such as 2,3-dichloroquinoxaline-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-5- or 6-carboxylic acid chloride or -5- or 6-sulfonic acid chloride; and (F) Halogeno-6-pyridazonyl-1-alkanoyl halides or 1-benzoyl halides, for example 4,5-dichloro-6-pyridazonyl-1-propionyl chloride or -1-benzoyl chloride.

Further compounds which contain at least two reactive substituents can be employed, for example:

(G) Anhydrides or halides of aliphatic, α,β-unsaturated mono- or di-carboxylic acids having preferably 3 to 5 carbon atoms, such as maleic anhydride, acryloyl chloride, methacryloyl chloride and propionyl chloride;

(H) Anhydrides or halides of aliphatic mono- or di-carboxylic acids having preferably 3 to 10 carbon atoms, or of aromatic carboxylic acids, containing mobile halogen atoms, for example chloroacetyl chloride, β-chloro-propionyl chloride, α,β-dibromopropionyl chloride, α-chloro- or β-chloro-acryloyl chloride, chlormaleic anhydride and β-chloro crotonoyl chloride, and fluoro-nitro- or chloro-nitro-benzoic acid halides or -sulfonic acid halides in which the fluorine atom or the chlorine atom is in the o-position relative to the nitro group;

(I) Carboxylic acid N-methylolamides or reactive functional derivatives of these methylol compounds. Carboxylic acid N-methylolamides are in particular N-methylol-chloroacetamide, N-methylol-bromoacetamide, N-methylol-α,β-dichloro- or -dibromo-propionamide, N-methylol-acrylamide and N-methylol-α-chloro- or -α-bromo-acrylamide. Reactive derivatives of the carobxylic acid N-methylolamides are, for example, the corresponding N-chloromethyl- or N-bromomethyl-amides;

(J) Free or etherified N-methylolureas of N-methylolmelamines, for example N,N-dimethylolurea, N,N-dimethylolurea dimethyl ether, N,N'-dimethylolethylene- or -propylene-urea, 4,5-dihydroxy-N,N'-di-methylol-ethylene-urea or 4,5-dihydroxy-N,N'-di-methylol-ethyleneurea dimethyl ether and di- to -hexamethylolmelamine, trimethylolmelamine dimethyl ether, pentamethylolmelamine di- to -trimethyl ether and hexamethylol-melamine pentamethyl or hexamethyl ether;

(K) Condensation products of dialkylalkanes containing at least one phenolic hydroxyl group and halogenohydrins, for example the diepoxide obtained from 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Di-isocyanoates or Di-isothiocyanates, such as alkylene (C$_2$–C$_4$)diisocyanate, e.g. ethylene diisocyanate, phenylene- or alkyl-(C$_1$–C$_4$)-substituted phenylenediisocyanates, e.g. phenylene-1,4-diisocyanate or toluene-2,4-diisocyanate, or phenylene-diisothiocyanates, for example phenylene-1,4-diisothiocyanate; or (N) Further reactive compounds, such as trisacryloyl-hexahydro-s-triazine, epoxides or aziridines. Hydrophilic polymers are used in dilute solutions during the concentration polarization step to react with and to coat the mebrane substrate, and, optionally, to modify the support prior to this step. The preferred polymers are polyfunctional polymers which contain aliphatic (acyclic or cyclic), aromatic, or heterocyclic amino groups which can be primary, secondary, or tertiary. Or, alternatively, but less preferred, they may be polymers of hydroxyl or thio-functions. Examples of such polymers are polyethyleneimine (M.W. 150–2,000,000) which can be partially alkylated (methyl iodide) or otherwise modified, polyvinylamine (M.W. 1000 to 2,000,000), polyvinyl alcohol (M.W. 2,000 to 200,000) or partially esterified polyvinyl alcohol, cellulose derivatives, such as ethyl cellulose, carboxymethyl cellulose, hydroxymethylcellulose or hydroxyethyl cellulose, polyvinylaniline, polybenzylamines, polyvinyl mercaptan, polymers of 2-hydroxylethyl or 2-aminoethylmethacrylates, polyvinylimidazoline, amine modified polyepihalohydrin (described in U.S. Pat. No. 1,588,807) polydiallylamine derivatives and polymers containing piperidine rings (described in GB 2,027,614A), condensation products of dicyandiamide, amine (ammonium) salts (NH$_4$Cl) and formaldehyde, (US 3 290 310), diamino condensation products of polyanhydrides, aminoalkyl polysulphones, aminoalkyl polyarylene (phenylene)

oxides (e.g. amino methylated polyphenylene oxide) and hydrophilic amines containing polymers described in EP 8,945 or polyamido-polyamine epichlorohydrin resins. The above polymers may be in part a copolymer or a polymer containing other monomeric units, block polymers or graft polymers. If they are copolymers, the other monomeric units may or may not contain ionic groups ($-SO_3^\ominus$, $-COO^\ominus$, $-N^\oplus R_3$). Examples of such copolymers are such of styrene sulfonate (sodium salt)/vinyl aniline, 2-aminoethylmethacrylate/acrylic acid, vinyl aniline/vinylbenzyltrimethyl ammoniumchloride or vinylamine/vinylsulfonate.

The preferred polymers are polyaliphatic (acyclic or cyclic) amines. Polyethyleneimine (PEI) is an example of this group, as well as the copolymers mentioned above. The range of molecular weights may be between 150 and 2,000,000, but preferably between 1000 and 200,000, and most preferred 50,000 to 200,000. Low molecular weight polymers or oligomers (150 to 1000) may be used, but the increase in solute rejection of the final membrane is not as great as when higher molecular weight polymers are used.

Water is the preferred solvent for the aforementioned compounds, although other solvents such as low molecular weight alcohols or ketones may be used along or in combination with water. The range of polymer concentration has already been discussed, and may range from 0.01 to 5%, but preferably between 0.01 and 2%, the most preferred being between 0.01 and 1.0% for the CP step, and 2 to 10% for reducing membrane cut-offs prior to the CP step.

The optimum temperature is a function of the reaction kinetics of the reactants, and may vary between $-20°$ and $80°$ C., but preferably between $0°$ and $25°$ C.

The pH range is approximately between 7 and 12, but preferably between 8 and 10.

The different supports containing polyacrylonitriles which may be placed in the pressure cell prior to the deposition of the thin film of polymer (e.g. PEI) are for example:

A. Polyacrylonitrile membrane modified with hydroxylamine, cyanuric chloride, PEI, followed by extensive washing.

B. A polyacrylonitrile membrane modified with hydroxylamine.

C. A polyacrylonitrile membrane modified with hydroxylamine and cyanuric chloride. Further suitable starting (basic) membranes are those mentioned hereinbefore, preferably such as aminosubstituted, chloromethylated or aminomethylated polysulfones, further cellulose acetates and bisphenolepoxiadducts.

The polymer solution from which the thin film is deposited may or may not contain a polyfunctional reagent as a function of the membrane reactivity in A, B or C above. For membranes A and B, the solution contains a polyfunctional reagent (e.g. cyanuric chloride in the concentration range of about 0.5 to 2.0 mM/l with the preferred range of 0.1 to 0.9 mM/l).

The polyfunctional reagent is used to bond the polymer to the support and to increase the polymer's molecular weight.

Membrane C, on the other hand, contains reactive groups, and the polymer solution need not contain a polyfunctional reagent. It may be desirable, however, to add a polyfunctional reagent to increase the molecular weight of the polymer.

In all cases, after the concentration polarization step, the polymer coating is crosslinked, e.g. with a reactive dye.

The magnitude of the pressure (suitable range 2 to 100 bars) applied during the concentration polarization is important. It was found that the best results (high rejection concomitant with high flux) were obtained at 10 bars or higher. As a rule, lower pressures did not result in membranes with sufficient rejection. The pressure is, however, a function of the concentration of PEI and the duration of application. For the conditions of PEI concentrations less than 1% and times of less than 30 minutes, pressure above 10 bars are required. Higher pressures require shorter time periods. A useful range being between 10 and 100 bars, and more preferably between 10 and 30 bars. Lower pressures may be useful for longer times or higher polymer concentrations. The time of pressure application may range from 10 sec. to 4 hours, but preferably between 10 and 60 minutes.

The thin deposited film is crosslinked and/or charged with a polyfunctional reagent. The function of these reagents is to crosslink the thin layer and if the reagent is ionic, charges are also incorporated (for example, $-SO_3^\ominus$, $-COO^\ominus$, $-N^\oplus R_3$) within the layer.

If the thin layer is monomolecular, then the function of cross-linking is as a rule not necessary and the primary importance of the reagent is the introduction of charged or ionic groups.

In the preferred embodiment, ionic polyfunctional reagents optionally together with non-ionic ones, were found to give membranes with relatively high flux concomitant with a high rejection. In another variation, the polyfunctional reagents are hydrophilic or partially water soluble. In this case they function simply to crosslink the adsorbed or coated layers. The polyfunctional compounds are as a rule those of low molecular weight.

Unlike the prior art manufacture of composite UF/RO membranes, the crosslinking (and charging step) is carried out preferably in an aqueous solution. Thus water soluble polyfunctional reagents are found to give good results. The preferred reagents in this group are ionic or charged derivatives of triazinyl or pyrimidyl compounds. Reactive dyes belong to this class as do non-colored compounds with the aforementioned functions. An effective reagent may crosslink via chemical bonds, electrostatic interactions of ionic groups, and by chelation or coordination of polymeric functions with metal ions. The preferred mode of crosslinking is via a covalent bond, though the other two modes may also be used. In some cases all three modes of crosslinking may be operative. Preferred is the cross-linking via chemical bonds. One can use one or more than one compounds for cross-linking, e.g. a combination of a reactive dyestuff together with a metal salt (copper sulfate).

Included within the scope of this invention are also hydrophilic polyfunctional reagents such as low molecular weight difunctional epoxides, aziridines, aldehydes, anhydrides, diacyl halocompounds, cyanuric chloride and tetrachloropyrimidine. While many of the above reagents can be applied in aqueous solutions within a narrow range of pH and temperature, the acyl halides must be dissolved in aprotic solvents.

Reagents which contain an ionizable group and the radical which forms a bridge member between this group and the membrane, can be colorless or colored compounds, for example ionic reactive dyes, which can belong to various categories, for example anthraquinone, formazan or preferably azo dyes which are optionally metal complexes. Reactive groups which enable these reagents to react to the coated polymers are the following: carboxylic acid halide groups, sulfonic acid halide groups, radicals of $\alpha,\beta$-unsaturated carboxylic acids or amides, for example of acrylic acid, methacrylic acid, $\alpha$-chloroacrylic acid, $\alpha$-bromoacrylic acid or acrylamide radicals of preferably low halogenoalkylcarboxylic acids, for example of chloroacetic acid, $\alpha,\beta$-dichloropropionic acid or $\alpha,\beta$-dibromopropionic acid, radicals or fluorocyclo-butanecarboxylic acids, for example of tri- or tetra-fluorocyclo-butane-carboxylic acid, radicals containing vinylacyl groups, for example vinylsulfone groups or carboxyvinyl groups; radicals containing ethylsulfonyl ($-SO_2CH_2CH_2OSO_2OH$, $-SO_2CH_2CH_2Cl$) or ethylamino sulfonyl groups ($-SO_2NHCH_2CH_2OSO_2OH$) and halogenated heterocyclic radicals such as dihaloquinoxalines, dihalopyridazonyl, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines.

Suitable halogen atoms are fluorine, bromine and especially chlorine atoms.

Examples of reactive groups present in the crosslinking agent are monochlorotriazinyl, dichlorotriazinyl, 2,4-dichloropyrimidinyl, 2,3-dichloroquinoxaline-6-carbonyl, 4,5-dichloro-pyridazonylpropionyl, 1,4-dichloro-phthalazine-6-carbonyl, chlorobenzothiazole linked to the dye via $-COHN$, $-SO_2NH-$, $-NH-Ar-N=N-$ (Ar=phenylene or naphthylene), 5-chloro-4-methyl-2-methyl-sulphonyl pyrimidinyl, vinylfulphonyl, $\beta$-sulphato ethylsulphonyl, $\beta$-sulphatoethyl aminosulphonyl, $\beta$-chloroethylsulphonyl or $\beta$-sulphatopropionamido.

Highly preferred crosslinking agents are reactive azo dyestuffs containing sulphonic acid ($-SO_3H$) or carboxyl ($-COOH$) groups (either group may also be present in salt form, such as alkali metal salt (sodium salt)) and as reactive groups monochlorotriazinyl, dichlorotriazinyl, 2,4-dichloropyrimidinyl, vinyl sulfonyl, $\beta$-sulfatoethylsulfonyl, $\beta$-chloroethylsulfonyl or $\beta$-sulfatoethylaminosulfonyl radicals).

Ionizable groups which the membrane-modifying substances (or the membranes themselves) may contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

The membranes which contain at least at the membrane surface a polymer modified by an azo dye containing sulfonic acid groups are particularly valuable and versatile in use. The azo dye can also contain a metal, for example copper, bonded as a complex.

Furthermore, it is also possible to introduce the charged groups into the membrane by reacting reagents, such as alkyl halides or benzyl halides, with an amino group of the polymer chain. In this way, for example, the polyethylenimine radical can be modified by methyl iodide or dimethyl sulfate. On the other hand, the modification can also be effected with chlorosulfonic acid itself.

In order to crosslink/charge the coated polymer a so-called one-stage process can be carried out wherein the compound carrying the charge and the so-called fixing agent (for example alkali) are used in one bath.

Further a so-called two-stage process can be used which comprises first the step involving the adsorption of the compound carrying the charge and then, in a separate reaction solution, the fixing step (chemical reaction between reactive dye and the (modified) membrane). The two-stage process is preferred, since on the one hand, the concentration of reactive dye in the adsorption solution can be kept lower and a solution of this type can optionally be used several times; and, on the other hand, the total reaction time is shorter than in the case of the one-stage process.

In the two-stage process, the concentration of a reactive dye in aqueous solution can be about 0.5 to 3%; the adsorption is carried out, for example, at temperatures of 20° to 35° C. over a period of 2 to 60 minutes; the pH value can be 4 to 8. Fixing can then be carried out in an aqueous solution, the pH of which has been adjusted to 9 to 12, and the reaction time can be about 30 minutes. The pH is adjusted to the desired value using any desired inorganic (sodium carbonate) or organic bases.

Depending on the intended application, the membranes can be in various (flat or tubular) forms, for example in the form of sheets, leaves, tubes, tablets or in the form of a pocket, bag, cone or of hollow fibres. When subjected to severe pressure, the membranes can, of course, be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membranes to heat treatment (50° to 150° C.) before or after their chemical modification it is possible to change the pore size and thus the flux and the rejection of the membranes.

The inventive membranes show a good rejection in the range of the temperatures mentioned together with an extraordinary flux. They show good stabilities to solvents, at high temperatures (up to 70° C.), under a broad range of pressue (2 to 100 bars, preferably 2 to 50 bars and especially 2 to 30 bars) and to pH extremes (range of about 2 to 12).

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge. The separation process (RO- or UF-process) for concentrating and/or purifying liquids or separating components dissolved in these liquids comprises disposing on one side of the semipermeable membrane a solution with a solute and applying a hydraulic pressure against said solution and said membrane, said pressure being greater than the osmotic pressure of said solution.

1. The separation of organic and metal-organic ionic substances from by-products. 8 reaction mixtures and other substances which are contained therein, for example from salts, such as sodium chloride, sodium sulfate or sodium acetate or acids.

2. The separation of metal complexes of heavy metals from salts which are not in a complex form.

3. The purification of effluents which are obtained from the production and use of dyes and fluorescent brighteners.

4. The separation of ionic molecules (salts) from aqueous solution, i.e. the concentration of aqueous solutions which contain metal complexes, surfactants, dyes or proteins, the results obtained in this case being better, with regard to the efficiency (permeability (flux) per unit time) and the separating effect, than those obtained with known membranes.

5. The separation of charged compounds from uncharged ones.

EXPERIMENTAL

The application of pressure for the deposition of a thin film may be performed on flat, tubular or hollow fibers. The cells for such an application are exactly the same as described below for membrane testing. Thus, for example, a flat circular membrane with a surface area of 13 cm$^2$, resting on a sintered stainless steel disc, is used in a cylindrical cell made of stainless steel. A 150 ml of a dilute polymer solution (e.g. 0.1% PEI) is introduced onto the membrane in the steel cylinder, and, using nitrogen, subjected to a pressure of 10 bars. The application of pressure results in a volume flow across the membrane and the formation of a thin concentrated PEI layer.

In addition to the modification on flat membranes, tubular configuration (e.g. 60 cm long, with an outer diameter of 1.4 cm) may be modified by placement in a perforated tube of stainless steel and with the application of pressure (inside out) across the membrane containing a dilute solution of polymer. A description of the tubular unit is given in the section on membrane testing.

The separation effect (the rejection) of the membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to a pressure of 14 bars. The solution is stirred magnetically. The liquid which collects on the outlet side of the membrane is examined to determine its content (concentration) $c_2$ of the substance to be tested, 3.5 ml samples being taken from the start of the experiment. In general, the amount which flows through the membrane and the composition of the three samples are constant. The rejection can be calculated from the values obtained, using the equation.

$$R = \frac{c_1 - c_2}{c_1} \cdot 100\%$$

The amount of material passed through the membrane per surface and time unit is found to be $$F = V \cdot S^{-1} \cdot t^{-1} \quad \begin{array}{l} V = \text{volume} \\ S = \text{membrane surface area} \\ t = \text{time} \end{array}$$

F is appropriately expressed in m$^3$.m$^{-2}$.d$^{-1}$, i.e. the number of cubic meters per square meter surface area of the membrane and per day, or in 1 m$^{-2}$h$^{-1}$, i.e. liters per square meter surface area of the membrane and per hour.

In addition to the measurements on flat membranes, measurements on tubular membranes 60 cm long and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent flow under 20 bar pressure. The flow rate is kept constant at 10–15 liters per minute. The rejection (R) and the flux (F) are calculated in the same way as for the flat membranes.

In the following examples, the dyes and colourless compounds of formulae (101) to (107) are used as reactive agents for cross-linking and charging the polymer layer, while the dyes of formulae (108) to (110) are used in test solutions.

Parts and percentages are by weight.

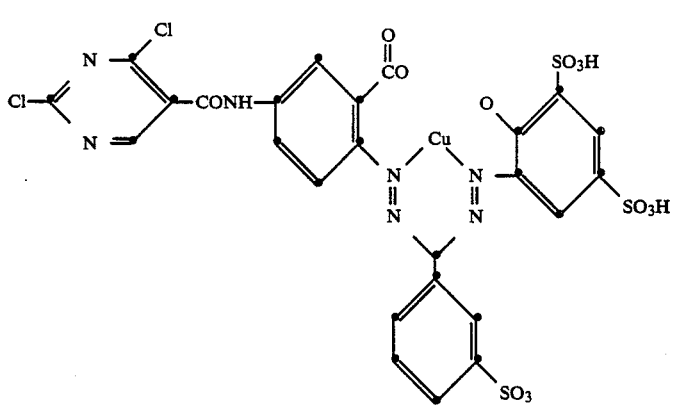

(101)

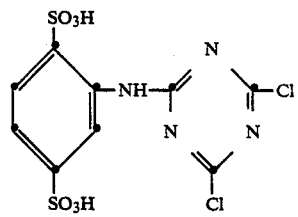

(102a)

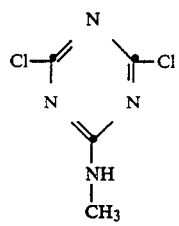 (102b)
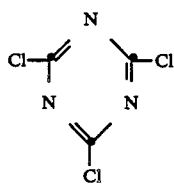 (102c)
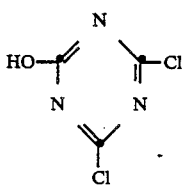 (102d)
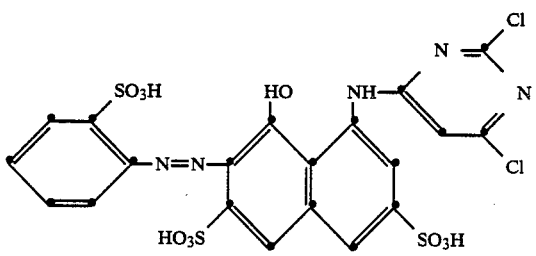 (103)
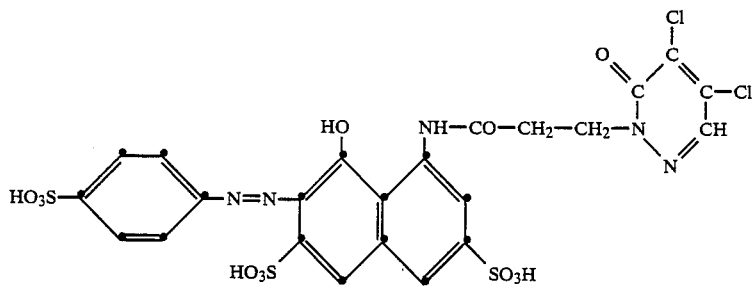 (104)
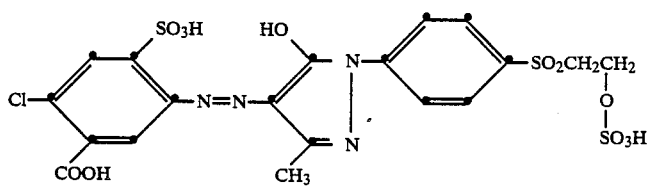 (105)
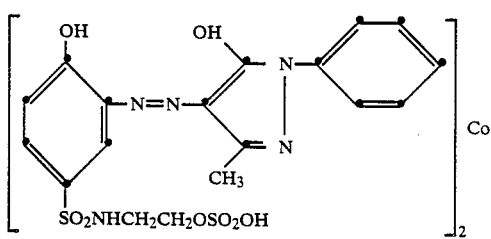 (106)

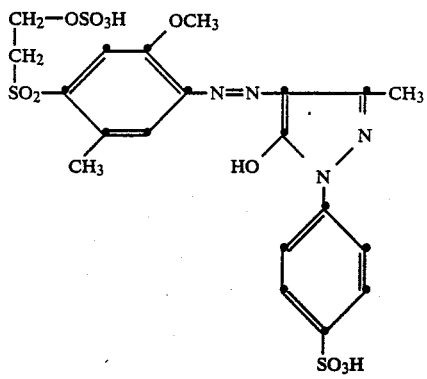
(107)

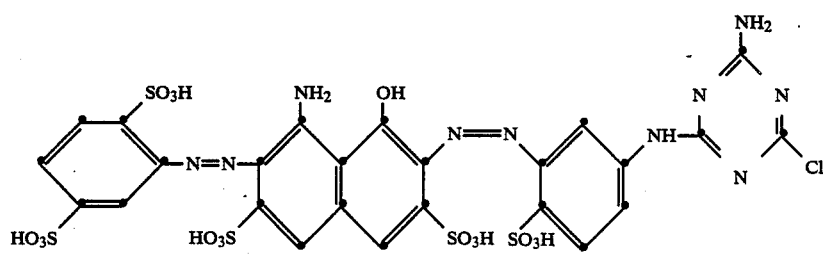
(108)

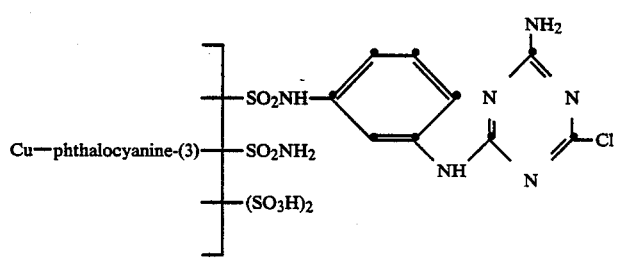
(109)

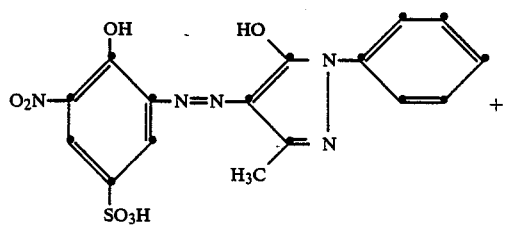
(110)

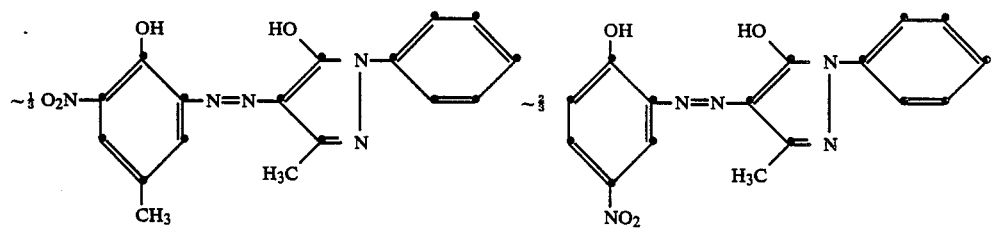

(1:2 chromium complex)

EXAMPLE A

A polyacrylonitrile membrane is modified, prior to the concentration polarization step, by the following sequence of steps:

(1) The membrane is placed in an aqueous solution containing 10% of hydroxylamine hydrochloride ($NH_2OH \cdot HCl$) and 7.5% of $Na_2CO_3$ for 5 minutes at 60° C., (2) washed for 15 minutes, and (3) placed in a 2% aqueous suspension of cyanuric chloride (prepared by dissolving 2 g of cyanuric chloride in 20 ml acetone and adding to 80 ml $H_2O$) at 0° to 4° C. for 10 minutes.

(4) Washed in ice water for 15 minutes, (5) immersed in 10% solution of polyethyleneimine (M.W. 30,000) for 10 minutes at pH 8.5 and washed for 10 minutes with tap water.

(6) The membrane is placed in a pressure cell and the excess polyethyleneimine is washed out by passing 100 ml of water under a pressure of 20 bars.

EXAMPLE 1

A membrane according to Example (A) is placed in a pressure cell containing an aqueous solution of 0.1% of PEI Polyethyleneimine (M.W. 30,000) and 0.3 mM/l of cyanuric chloride at 5° C. 20 ml of liquid, under a pressure of 20 bars is passed through the membrane, which is then immersed in an aqueous solution of 1% of dye of formula (101) and 10% of sodium chloride for 15 minutes and then in 5% solution of $Na_2CO_3$ for 20 minutes. The membrane is then placed in a pressure cell for testing. The results are given in Table II.

Good results are also obtained when using the compounds of formulae (102) to (107) instead of the compound of formulae (101) as cross-linking agents.

EXAMPLE 2

Example 1 is repeated with the difference that the solution in the pressure cell contains 0.02% of polyethyleneimine and 0.3 mM/l of cyanuric chloride at room temperature. The results are given in Table II.

EXAMPLE 3

Example 1 is repeated with the difference that the solution in the pressure cell contains 0.01% and 0.3 mM/l of cyanuric chloride at 40° C. The results are given in Table II.

TABLE III

Performance of modified polyacrylonitrile membranes of Example 3
Testing conditions: solution of dyestuff of formula (108), 15000 ppm + 2% NaCl at 20 bars, R.T.

| Collected Permeate Volume ml | Performance | | | |
|---|---|---|---|---|
| | Flux of water $l/m^2 \cdot d$ | Flux of dye $l/m^2 \cdot d$ | Rej. Dye % | Rej. Salt % |
| 20 | 13800 | 2700 | 98.1 | −4.2 |
| 30 | 9000 | 2000 | 98.5 | −20.0 |
| 40 | 9800 | 2940 | 99.2 | −4.7 |

EXAMPLE 5

Example (A) and Example 1 are repeated on 60 cm long tubular membranes instead of flat sheets. The results are given in Table IV.

TABLE Iv

| Membrane No. | Time of modification min. | Performance in 6% dye (108) solution | | |
|---|---|---|---|---|
| | | Flux $l/m^2 \cdot d$ | Rej.dye % | Rej. salt % |
| 1 | 15 | 2800 | 98.9 | −31.0 |
| 2 | 30 | 2300 | 99.3 | −15.0 |
| 3 | 45 | 2100 | 98.6 | −17.0 |
| 4 | 60 | 2100 | 98.3 | −21.0 |

Test conditions as indicated in Table III; dyestuff solution contains however 6% of dyestuff.

TABLE II

Performance of modified polyacrylonitrile membranes of Examples 1 to 3

| Example Nr. | Flux of water after washing/ before pressure step $l/m^2 \cdot d$ | Composition of the modification solution | | Temp. of the modification (°C.) | Volume transferred ml | Results after modification | | | |
|---|---|---|---|---|---|---|---|---|---|
| | | polyethyleneimin (%) | cyanuric chloride (mM/l) | | | Flux of water $l/m^2 \cdot d$ | Flux of dye solution $l/m^2 \cdot d$ | Dye Rej. (%) | NaCl Rej. (%) |
| 1 | 9600 | 0.1 | 0.3 | 5 | 20 | 7490 | 3360 | 99.4 | −12.5 |
| 2 | 3500 | 0.02 | 0.3 | R.T. | 20 | — | 2700 | 99.93 | −21.0 |
| 3 | 5760 | 0.01 | 0.3 | 40 | 20 | 5100 | 2880 | 99.6 | −5.1 |

Testing conditions: flat cells, 20 bars, R.T., dye of formula (108), 15000 ppm +2% NaCl.

EXAMPLE 4

Example (A) is repeated up to and including the hydroxylamine step. The membrane is then placed in a pressure cell as in Example 1, and the procedure of Example 1 is repeated, with the difference that the solution contains 1% of polyethylene imine (M.W. 30.000) and 0.3 mM/l of cyanuric chloride, at a pressure of 10 bars for the time required to permeate 20 ml, 30 ml, and 40 ml of permeate through three different membranes respectively. The results are given in Table III.

EXAMPLE 6

An ultrafiltration membrane made from chloromethylated polysulfone of MW 36,00 and with repeating units of the fomula

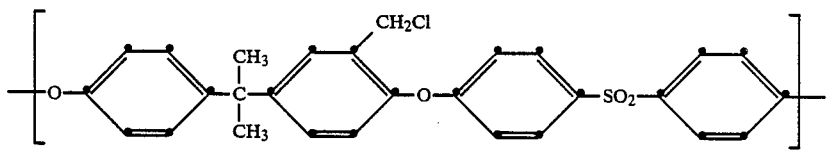

with a rejection to dye of formula (108) (1,5%) of 85% is modified according to the procedure of example 1 (PEI-Cyanuric-chloride-dye of formula (108). The membrane after modification has a flux and rejection of 2842 $l/m^2.d$ and 99.2% to 1.5% solution of dye of formula (108) at 20 bar and room temperature.

EXAMPLE 7

An ultrafiltration membrane made of cellulose diacetate with a rejection to dye of formula (108) (1.5%) of 78% at 20 bar is placed in a 2% aqueous suspension of cyanuric chloride at pH 10 for 30 minutes, washed in tap water for 30 minutes and the procedure of example 6 is repeated. After modification the membrane shows a rejection of 98% to 1.5% solution of dye of formula (108) with a flux of 1800 l/m².d

EXAMPLE 8

An ultrafiltration membrane made of a polyepoxide with repeating units of the formula.

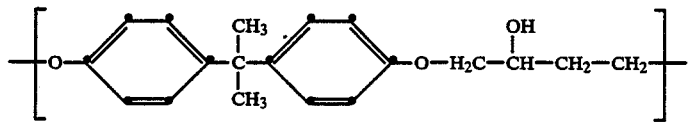

is modified according to the procedure of example 7. The membrane's rejection and flux to test dyestuff of formula (108) (1.5%) before and after modification are 91%/2360 l/m².d and 98.6%/1800 l/m².d, respectively.

We claim:

1. A dynamically formed, bifurcated membrane for reverse osmosis or ultrafiltration comprising a thin, hydrophilic, crosslinked, polymeric film deposited on under pressure and chemically bonded to a porous, polymeric support, wherein the thin, hydrophilic film is crosslinked by polyfunctional low molecular weight compounds, and the porous polymeric support is optionally crosslinked.

2. A membrane as in claim 1 obtained by
   (a) coating a chemically-reactive polymer from a dilute aqueous solution under pressure to form a thin film on a porous polymeric support having functional moieties reactive with the polymeric thin film, and
   (b) crosslinking the thin polymeric film deposited on and chemically bound to the porous polymeric support with polyfunctional low molecular weight compounds.

3. A membrane as in claim 2, wherein the porous polymeric support having functional moieties comprises a polymer selected from the group consisting of cellulose, cellulose derivatives, polyvinyl alcohols, polyacrylonitriles, polyepoxides, polystyrenes, and polysulfones into which reactive functional moieties have been introduced by chemical modification.

4. A membrane as in claim 2, wherein crosslinking step (b) has been carried out with polyfunctional, ionic, low molecular weight compounds.

5. A membrane as in claim 1, wherein the thin, polymeric, deposited film has a thickness less than 5000 A, preferably less than 1000 A.

6. A process for separating chemical species comprising the step of filtering aqueous solutions of mixtures of species through the membrane of claim 1.

7. A process for reverse osmosis or ultrafiltration of aqueous liquids comprising the steps of:
   (a) disposing on one side of a membrane as in claim 1 a solution bearing a solute, and
   (b) filtering that solution through said membrane by applying a hydraulic pressure to the solution and the membrane greater than the osmotic pressure of the solution.

8. A membrane according to claim 1, wherein the thin film is a monomolecular layer.

9. A process for making a dynamically formed bifurcated membrane for reverse osmosis or ultrafiltration comprising a thin, hydrophilic, crosslinked, polymeric film deposited on under pressure and chemically bonded to a porous, polymeric support by steps comprising:
   (a) coating a chemically-reactive polymer from a dilute aqueous solution under pressure to form a thin film on a porous polymeric support having functional moieties reactive with the polymeric thin film, and
   (b) crosslinking th thin polymeric film deposited on and chemically bound to the porous polymeric support with polyfunctional low molecular weight compounds.

10. A process as in claim 9, wherein the chemically-reactive polymer of step (a) and the polyfunctional low molecular weight compounds of step (b) are codeposited from the dilute aqueous solution under pressure onto the porous polymeric support.

11. A process as in claim 10, followed by crosslinking the reactive polymer bonds with the polyfunctional low molecular weight compounds.

12. A process as in claim 10, wherein the polyfunctional, low molecular weight compound is colorless, nonionic and selected from the group consisting of cyclic carbonic acid imide halides, dihalides of dicarboxylic acids, dialdehydes, and trihalides of tricarboxylic acids.

13. A process as in claim 9, wherein crosslinking step (b) is carried out with ionic, polyfunctional, low molecular weight compounds.

14. A process as in claim 13, wherein the polyfunctional low molecular weight compounds of step (b) are nonionic compounds containing at least two substituents reactive with the polymeric thin film and the functional moieties of the porous support.

15. A process as in claim 14, wherein the polyfunctional, nonionic, low molecular weight compound is colorless and selected from the group consisting of carbonic acid imide halides, dihalides of dicarboxylic acids, dialdehydes, and trihalides of tricarboxylic acids.

16. A process as in claim 9, wherein the porous support having functional moieties of step (a) is selected from the group consisting of cellulosics, cellulose derivatives, bisphenol epoxy adducts, polymers derived from polyvinyl alcohol by reaction with organic compounds containing at least two functional moieties, polyacrylonitriles modified by reaction with hydroxylamine, polyacrylonitriles modified by reaction with hydroxylamine and an organic compound containing at least two functional moieties, polysulfones containing reactive moieties preferably aromatically substituted, and polystyrenes containing reactive moieties preferably aromatically substituted.

17. A process as in claim 16, wherein the reactive moieties attached to the aromatic polysulfones or polystyrenes have been introduced by a step selected from the group consisting of haloalkylation, chloromethylation, and coupling with diazocompounds, followed by further chemical modification after said step.

18. A process as in claim 16, wherein the compounds containing at least two functional moieties are selected from the group consisting of:
  (1) compounds containing reactive multiple bonds, epoxide, aziridine, aldehyde, imidate, isocyanate, hydroxyl, and anhydride moieties;
  (2) compounds containing substituents detachable as tertiary amines, compounds containing substituents detachable as anions, preferably halogen anions, and
  (3) compounds containing a combination of the moieties of (1) and (2) herein.

19. A process as in claim 18, wherein the compounds are selected from the group consisting of cyclic carbonic acid imide halides, isocyanates, isothiocyanates, and N-methylol compounds.

20. A process as in claim 19, wherein the compounds containing at least two functional moieties are selected from the group consisting of halogenodiazines, halogenotriazines, halogenodiazines with ionic groups, and halogenotriazines with ionic groups.

21. A process as in claim 16, wherein the polyfunctional low molecular weight compounds of step (b) are ionic compounds containing at least two substituents reactive with the polymeric thin film and the functional moieties of the porous support.

22. A process as in claim 21, wherein the polyfunctional ionic compound is a reactive azo dye bearing a substituent selected from the group consisting of sulfonic acid, carboxyl moiety, and ammonium moiety.

23. A process as in claim 22, wherein the polyfunctional ionic compound is a reactive azo dye containing at least one of sulfonic acid and carboxylic acid and a reactive moiety selected from the group consisting of monochlorotriazinyl, dichlorotriazinyl, 2,4-dichloropyrimidinyl, vinyl sulfonyl, beta-sulfatoethylsulfonyl, beta-chloroethylsulfonyl, and beta-sulfatoethylamino sulfonyl.

24. A process as in claim 21, wherein the polyfunctional, ionic, low molecular weight compound is colorless and is at least one of halotriazinyl and halopyrimidyl compounds.

25. A process as in claim 9, wherein the chemically-reactive polymer is at least one of aliphatic and aromatic polymer containing a moiety selected from the group consisting of amino, hydroxyl, thiol, and epoxy.

26. A process as in claim 25, wherein said polymer is selected from the group consisting of polyethyleneimines, polyvinyl alcohols, cellulose derivatives, polyvinylamines, polyvinyl anilines, polypiperidines, polydiallyamines, amino-modified polyepihalohydrins, condensation products of dicyandiamide, methylolated ammonium salts, diamino condensation products of polyanhydrides, aminoalkylated polysulfones, aminoalkylated polyphenylene oxides, and polyamidopolyamino epichlorohydrin resins.

27. A process as in claim 9, wherein the dilute aqueous solution of step (a) contains from about 0.01 to about 5 percent by weight of the chemically-reactive polymer.

28. A process as in claim 27, wherein the dilute aqueous solution of step (a) contains from about 0.01 to about 1 percent by weight of the chemically-reactive polymer.

29. A process as in claim 9, wherein the pressure employed in step (a) is from about 100 bar.

30. A dynamically formed membrane for reverse osmosis or ultrafiltration obtained by
  (a) depositing a chemically-reactive polymer from a dilute aqueous solution under pressure to form a thin film on a porous polymeric support having functional groups reactive with the polymeric thin film, and
  (b) crosslinking the thin polymeric film deposited on and chemically bonded to the porous polymeric support with polyfunctional low molecular weight compounds;
wherein
  (c) the polymeric porous support of (a) is selected from the group consisting of cellulose, cellulose derivatives; bis-phenol-epoxy adducts; polyvinyl alcohol, chemically modified through reaction with an organic compound containing at least two functional groups; polymers of acrylonitrile, chemically modified by reaction with hydroxylamine or hydroxylamine and an organic compound containing at least two functional groups; aromatic polysulfones, and polystyrenes containing reactive groups; and
  (d) the polyfunctional, low molecular weight compounds of (b) are at least one of a group consisting of organic compounds containing reactive multiple bonds, epoxide, aziridine, aldehyde, imidate, isocyanate, hydroxyl, and anhydride groups, compounds containing substituents detachable as tertiary amines or as anions, halogen anions, and compounds containing any combination of these moieties.

31. The dynamically formed membrane of claim 30, wherein the polystyrene of (c) has the reactive groups attached to the aromatic moieties of these polymers.

32. The dynamically formed membrane of claim 30, wherein the anion of (d) is a halogen anion.

* * * * *